E. D. TILLYER AND C. H. KERR.
LENS TESTING INSTRUMENT.
APPLICATION FILED SEPT. 25, 1920.
1,383,678.
Patented July 5, 1921.
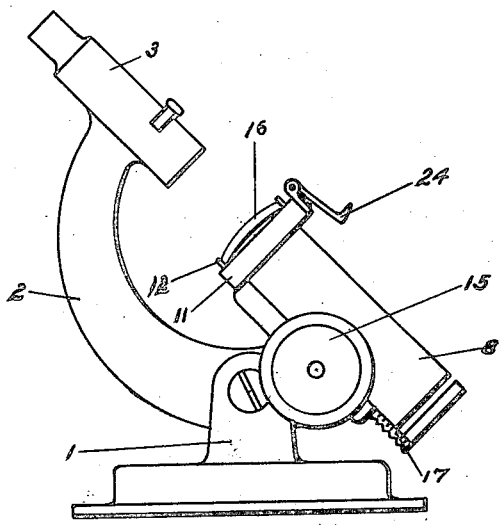
Fig. I
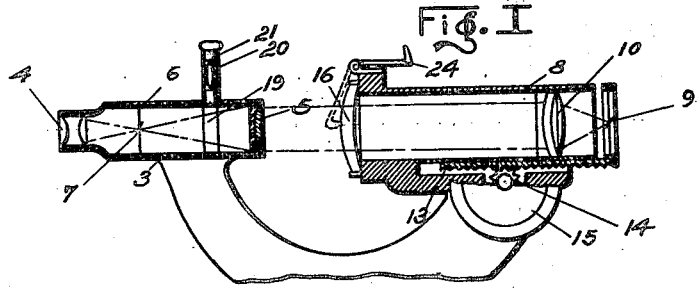
Fig. II
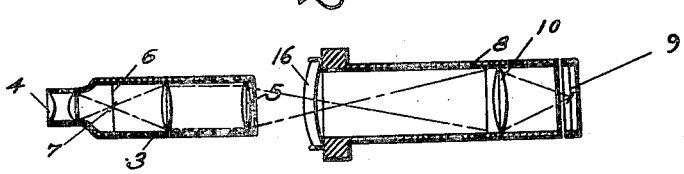
Fig. III
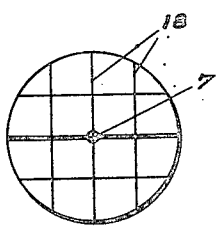
Fig. IV
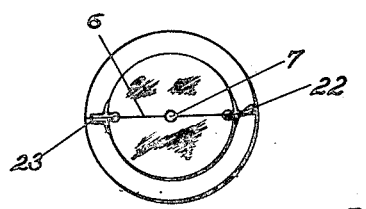
Fig. V
INVENTOR
EDGAR D. TILLYER
BY CHARLES H. KERR
ATTORNEYS

UNITED STATES PATENT OFFICE.

EDGAR D. TILLYER AND CHARLES H. KERR, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS-TESTING INSTRUMENT.

1,383,678.     Specification of Letters Patent.     Patented July 5, 1921.

Application filed September 25, 1920. Serial No. 412,639.

*To all whom it may concern:*

Be it known that we, EDGAR D. TILLYER and CHARLES H. KERR, citizens of the United States, residing at Southbridge, in the county of Worcester and State of Massachusetts, have invented certain new and useful Improvements in Lens-Testing Instruments, of which the following is a specification.

This invention relates to improvements in lens testing instruments and has particular reference to an improved instrument which may be selectively employed to either determine the power, the optical axis or center, or the geometrical center or axis of an optical lens, as may be desired.

A further object of the present invention is the provision of an improved attachment capable of use with known types of lens testing instruments which will enable the person conducting the test to use such instrument for entirely different purposes.

Other objects and advantages of this improved construction should be readily apparent by reference to the following specification taken in connection with the accompanying drawings, and it will be understood that we may make any modifications in the specific details of construction illustrated and described within the scope of the appended claims without departing from or exceeding the spirit of the invention.

Figure I represents a side elevation of one form of instrument embodying our improvement.

Fig. II represents a diagrammatic longitudinal section of such instrument.

Fig. III represents a similar view illustrating a different optical arrangement.

Fig. IV represents a reproduction of the image produced by the structure of Fig. II.

Fig. V represents a similar view as respects Fig. III.

In the drawings, the numeral 1 designates the base of a suitable lens testing instrument provided with the main frame 2 having an upper section 3 and lower portion 8. This upper section 3 is preferably provided with a suitable eye piece portion 4, objective 5 and cross line 6, having the circle 7 at the center thereof. The relationship between the members 4 and 5 is preferably such that parallel rays striking the member 5 will be focused as at 7 where the image is formed, which is viewed through the eye piece 4. This arrangement is intended for use in connection with the section 8 which contains as its essential features an illuminated target 9, a lens system 10, and a lens holding table 11 provided with the lens clamping points or members 12. The lens system 10 is preferably slidably mounted and equipped as with a rack 13 operable through a pinion 14 and hand wheel 15 to slide the lens system along in the frame or tube 8. The purpose of the lens system just briefly described is that the lens system 10 will render rays emanating from the illuminated target 9 parallel and such rays will be condensed as by the objective 5 to form an image at 7 viewed through the eye piece 4. In the event that a lens such as 16 is placed on the table 11 the lens system 10 may then be so adjusted that the combined effect of the lens system and lens introduced will again render the rays parallel, while the power of the lens may be read off on the scale 17 according to the adjustment required for the lens system 10. The target 9 has preferably the cross lines 18 thereon which will show up clearly and which should center at the circle 7, any failure of the parts so to center indicating that the lens 16 being tested is not optically centered with respect to the instrument, when it may be shifted around until the target 9 and cross lines 6 appear in proper relationship one to the other.

The lens having been properly centered and located it is frequently desirable to mark the point at which the optical center is located where it is desired to have the geometrical axis disposed or other features. Due, however, to the fact that the target image is produced through the combined lens system made up of the lenses 10 and 16, it is impossible to view the lens through the eye piece and telescope portion for such marking, or to determine the relationship of the lens and instrument without removing one's head from the eye piece and looking around the instrument, a movement to some extent interfered with by the frame and other parts of the machine.

To obviate these difficulties we, therefore, provide in the side of the tube 3 a slot as at 19, through which may be introduced from a suitable carrier 20 a lens 21 of such power and so disposed with respect to the objective 5 that the combined effect of the lenses 5 and 21 will be to produce at 6 an image of any object which may be located upon the table 11 destroying at the same time any image of the target 9 which is projected through the optical system 10 and lens 16 and associated parts. In this way we are able to produce at the eye piece an image of the lens which is in position on the table and in the event that the lens has already been mounted in a frame provided as with the bridge 22 and end pieces 23, it is then possible to view the entire device as shown in Fig. V and to line up the horizontal axis of the frame or mounting with the designation 6—7 at the image point of the instrument when removal of the lens 21 permits examination of the lens to determine the relationship between the optical and geometrical axes. Similarly, it is possible through the use of the marking device 24 pivoted to the side of the table, to mark the lens either uncut or mounted, with the desired axis points with relation to the instrument, or it is further possible by a separate hand marker to view the lens and mark on it the position at which the image of the line 6 and circle 7 appears on the lens as viewed through the eye piece 4.

We claim:

1. In a lens testing instrument the combination with a lens support, of means for projecting an image through a lens on the support with parallel emergent rays, an eye piece section reproducing the image of the object projected by said parallel rays, said eye piece including a physical object at the image point and a supplemental lens insertible in the eye piece section of power to focus at said image point the physical image of the lens being tested.

2. A device of the character described including a support for the lens to be tested and an eye piece unit having the optical property of reproducing an image projected by parallel emergent rays from the lens to be tested, and means for modifying the eye piece to produce the image of the actual lens being tested.

3. A device of the character described including a fixed lens support, an eye piece having a contained image point, a member forming a line disposed at the image point, said eye piece section having the property of reproducing the image of an object projected by parallel emergent rays from the lens being tested, and means for modifying the eye piece to produce the image of the lens being tested at the image point.

4. The combination with a lens to be tested, of a target, an optical system combined with the lens to be tested to project an image of the target, an eye piece disposed to receive said projected image, and means for modifying the optical system to eliminate the image of the target at the eye piece and substitute the physical image of the lens being tested.

5. An instrument of the character described including an eye piece, a testing stage and a target, means for forming an image of the target at the eye piece, and means for modifying the optical system to substitute the image of the stage for that of the target.

6. A device of the character described including a lens support, means for securing a lens in desired adjusted position thereon, an optical system for centering the lens by projection of an image therethrough, an eye piece for receiving the projected image, and means for modifying the optical properties of the system to substitute an image of the lens for that of the image projected through the lens whereby comparison of the position of the optical and geometrical centers of the lens while held in fixed position are made possible.

In testimony whereof we have affixed our signatures, in presence of two witnesses.

EDGAR D. TILLYER.
CHARLES H. KERR.

Witnesses:
  ALICE G. HASKELL,
  ESTHER M. LOFLER.